United States Patent [19]
Alles et al.

[11] Patent Number: 5,225,126
[45] Date of Patent: Jul. 6, 1993

[54] PIEZORESISTIVE SENSOR

[75] Inventors: Aldo B. Alles, Youngsville; Walter A. Schulze, Alfred Station, both of N.Y.

[73] Assignee: Alfred University, Alfred, N.Y.

[21] Appl. No.: 771,123

[22] Filed: Oct. 3, 1991

[51] Int. Cl.$^5$ ............................................. C04B 35/46
[52] U.S. Cl. ........................................ 264/63; 264/61; 264/65; 264/66; 73/763
[58] Field of Search ................... 264/61, 63, 65, 66

[56] References Cited

U.S. PATENT DOCUMENTS

| | | | |
|---|---|---|---|
| 4,073,846 | 2/1978 | Masamura | 264/61 |
| 4,280,846 | 7/1981 | Charles | 264/66 |
| 4,347,167 | 8/1982 | Payne | 264/61 |
| 4,490,318 | 12/1984 | Masuyama | 264/65 |
| 4,541,974 | 9/1985 | Yamaoka | 264/66 |
| 4,692,289 | 9/1987 | Hennings | 264/61 |

Primary Examiner—James Derrington
Attorney, Agent, or Firm—Howard J. Greenwald

[57] ABSTRACT

An electrical circuit containing novel piezoresistive sensor is disclosed. The sensor is connected to a source of direct current, and a stress of at least about 15 p.s.i. is applied to the sensor.

11 Claims, 7 Drawing Sheets

PIEZORESISTIVE SENSOR

FIELD OF THE INVENTION

A piezoresistive sensor which, when a specified amount of stress is applied to it, will demonstrate a substantial change in its resistivity.

BACKGROUND OF THE PRIOR ART

Many pressure, torque, vibration, and acceleration sensors which utilize the piezoresistive effect (i.e., the specific change of electrical resistivity with stress) are known. See, e.g., an article by Ahmed Amin entitled "Piezoresistivity in Semiconducting Ferroelectrics," appearing in "Disorder and Order in the Solid State", edited by Roger W. Pryor et al. (Plenum Publishing Company, 1988).

Some of the prior art piezoresistive sensors vary their resistivity with the application of stress. Thus, for example, some such sensors are fabricated on a precisely micromachined and etched n-type silicon wafer (diaphragm) whose optimum design is achieved by finite element techniques. See, for example, an article by A. Yasukawa et al. appearing in the Japanese Journal of Applied Physics, Volume 21, page 1049 (1982).

However, the prior art piezoresistive sensors whose resistivities vary with the application of stress do not show an appreciable response. Thus, the range of applications for these relatively crude sensors is limited.

It is an object of this invention to provide a piezoresistive sensor which exhibits a substantially greater change in its resistivity for a given change in applied stress than do prior art piezoresistive sensors.

It is yet another object of this invention to provide a process for fabricating the piezoresistive sensor of this invention.

It is yet another object of this invention to provide novel transducers comprised of the sensor of this invention.

It is yet another object of this invention to provide a novel process for the use of the piezoelectric sensor of this invention.

SUMMARY OF THE INVENTION

In accordance with this invention, there is provided a process for using a piezoelectric sensor with a specified composition. In this process, the sensor is connected to as source of electric current, thereby producing a circuit. At least about 15 p.s.i.g. of pressure is applied to the sensor, thereby causing a change in electrical properties of the circuit containing the sensor.

BRIEF DESCRIPTION OF THE DRAWINGS

The present invention will be more fully understood by reference to the following detailed description thereof, when read in conjunction with the attached drawings, wherein like reference numerals refer to like elements, and wherein.

DESCRIPTION OF THE PREFERRED EMBODIMENTS

A thermistor is a material whose resistivity varies with temperature. "PTC" ("positive temperature coefficient") thermistors increase their resistivities within a particular temperature range in the vicinity of their ferroelectric Curie temperature. These thermistors, and a process for making them, are disclosed in U.S. Pat. No. 4,981,633 of Alles et al., the disclosure of which is hereby incorporated by reference into this specification.

The sensor of this invention is a thermistor. In addition, the sensor also is a piezoresistive device whose resistivity changes substantially with changes in the applied stress.

Figure 1:
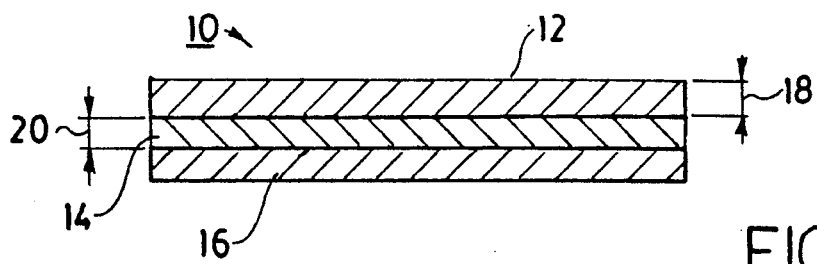
FIG. 1 is a side view of one preferred sensor of this invention.

FIG. 1 illustrates one preferred sensor of this invention, which contains a laminated structure. Referring to FIG. 1, sensor 10 is comprised of PTCR layer 12, insulating layer 14, and PTCR layer 16.

Each of layers 12 and 16 are preferably comprised of at least about 50 weight percent of n-type semiconductive ferroelectric material and, preferably, at least about 90 weight percent of such material. The term ferroelectric material, as used in this specification, refers to material which exhibits the spontaneous alignment of electric dipoles by their mutual interaction. By way of illustration, suitable ferroelectric crystalline materials include materials with the potassium diphosphate structure such as potassium dihydrogen phosphate, rubidium dihydrogen phosphate, potassium dihydrogen phosphate, and the like; germanium telluride, potassium dihydrogen arsenate, and the like.

Ferroelectric materials with the perovskite structure also may be used. Such materials include, e.g., barium titanate, strontium titanate, potassium niobate, lead titanate, lithium tantalate, lithium niobate, mixtures thereof, and the like.

A discussion of suitable ferroelectric materials may be found in, e.g., C. Kittel's "Introduction to Solid State Physics," Sixth Edition (John Wiley and Sons,Inc., New York, 1986), at pages 373-388.

The ferroelectric material used in layers 12 and 16 is doped, i.e., it contains from about 0.001 to about 5 atom percent of a donor dopant which will increase the free electron concentration of the material. The dopant used must be aliovalent, that is, it must contain one or more cations with a valence higher than that of the cation(s) in the crystal lattice, and whose cations will substitute for one or more of the cations in the crystal lattice of the ferroelectric material. As those skilled in the art are well aware, unless the addition of a material causes such substitution and also introduces new localized energy levels for electrons intermediate between the valence and the conduction band, the material is undoped. See, for example, pages 888–889 of Kingery et al., "Introduction to Ceramics" (John Wiley and Sons, New York, 1976).

In one preferred embodiment, the ferroelectric material is a metal titanate selected from the group consisting of barium titanate, strontium titanate, lead titanate, and mixtures thereof. With this preferred embodiment, the dopant is preferably a source of a trivalent or a pentavalent metal cation wherein the metal preferably is a metal of group IIIA of the periodic table, of group IIIB of the periodic table, of group VA of the periodic table, of group VB of the periodic table, and the rare earth element family. Thus, by way of illustration, the dopant is preferably selected from the group consisting of a source of trivalent lanthanum, a source of trivalent yttrium, a source of pentavalent niobium, a source of pentavalent antimony, a source of trivalent samarium, a source of trivalent holmium, a source of trivalent gadolinium, a source of trivalent bismuth, and mixtures therof.

One may add the dopant in elemental form to the titanate. In this embodiment, when the ferroelectric is sintered, the dopant will oxidize and assume its ionic form.

Alternatively, one may add the dopant in combined form. Thus, one may add a metal carbonate, a metal oxide, a metal oxalate, a metal hydroxide, or other metal compound. It is preferred, when a compound of the metal is used, to use a compound which, after sintering, will be in oxide form.

It is preferred that the dopant concentration be from about 0.1 to about 1 atom percent. As used this specification, the term atom percent refers to the extent to which the dopant substitutes the ferroelectric material. Thus, for example, if a source of lanthanum ion is added to barium titanate such that, for every 100 atoms of barium in the titanate, there is one substitution of lanthanum for barium, then in this case the dopant concentration would be 1 atom percent. For the purposes of this specification, it may be assumed that every atom in the source of dopant added to the ferroelectric material substitutes for one metal ion in the ferroelectric material.

In one preferred embodiment, in addition to containing from about 0.01 to about 5.0 atom percent of n-type dopant, the ferroelectric material also contains from about 0.001 to about 1.0 atom percent of counterdopant. As used in this specification, the term "counterdopant" refers to a source of metal cation wherein the metal is selected from the group $3d$, group $4d$, and group $5d$ of the periodic table. Thus, by way of illustration, the cation may be chromium, manganese, iron, cobalt, nickel, copper (of group $3d$), molybdenum, technetium, ruthenium (of group $4d$), wolfram, rhenium, osmium (of group $5d$), and the like.

In one embodiment, the aforementioned group $3d$ cations are preferred.

The source of the counterdopant may be added in elemental form to the ferroelectric material. In this embodiment, when the ferroelectric is sintered, the dopant will oxidize and assume its ionic form.

Alternatively, one may add the counterdopant in combined form. Thus, one may add a metal carbonate, a metal oxide, a metal oxalate, a metal hydroxide, or other metal compound. It is preferred, when a compound of the metal is used, to utilize a compound which, after sintering, will be in oxide form.

In general, the ratio of the concentration of the dopant to the concentration of the counterdopant will be at least about 1.1 and, preferably at least about 2.0; and it will generally range from about 2 to about 50.

In one embodiment, when the ferroelectric material is a metal titanate, it is preferred that the metal/titanium atom ratio be less than 1.0. In another preferred embodiment, the metal/titanium atom ratio is greater than 1.0. In yet another embodiment, the metal/titanium ratio is 1.0. As is know to those skilled in the art, in order to vary the metal/titanium ratio in the material, one may add a source of either the metal and/or the titanium to the material.

By way of illustration, wherein barium titanate is the ferroelectric material used, one may vary the barium/titanium atom ratio by adding from about 1.0 to about 50 atom percent of the titanium and, preferably, from about 1.0 to about 10 atom percent of the titanium. In this embodiment, the titanium may be added to the barium titanate in the form of an oxalate, a carbonate, an oxide, and the like. It is to be recognized that, when the titanium is added in combined form, one must calculate the concentration of the titanium in its compound form to determine the desired concentration.

In the preferred embodiment in which up to 10 atom percent of excess titanium is added, it is believed that the presence of the excess titanium facilitates the formation of a liquid phase during sintering of the barium titanate and promotes uniform distribution of the dopants and the sintering process.

In one embodiment, in addition to the excess titanium (which often is in the form of titania), one may also add from about 0.001 to about 10 mole percent of silica and/or alumina. The silica and/or alumina also tends to promote uniform distribution of the dopants and the sintering.

Referring again to FIG. 1, the thickness 18 of each of layers 12 and 16 is generally at least about 10 microns and, preferably, is at least about 100 microns.

Layers 12 and 16 may contain the same ferroelectric material. Alternatively, different ferroelectric materials may be present in these layers.

In one embodiment, either or both of layers 12 and 16 contain a mixture of ferroelectric materials such as, e.g., a mixture of barium titanate and strontium titanate.

Disposed between semiconductive layers 12 and 16 is an electrically insulative layer 14. As used herein, an insulating material is defined as one which has resistivity of at least about 1,000 ohm-centimeters between room temperature and a temperature of 500 degrees Celsius.

In one embodiment, it is preferred that the insulative layer 14 have a coefficient of thermal expansion which is from about 0.5 to about 1.5 times as great as the coefficient of thermal expansion of layers 12 and 16. It is preferred that each of layers 12 and 16 have substantially the same coefficient of thermal expansion. However, where layers 12 and 16 have different coefficients of thermal expansion, the insulative layer should have a coefficient of thermal expansion which is from about 0.5 to about 1.5 times the average coefficient of thermal expansion of layers 12 and 16. In this embodiment, it is preferred that the coefficient of thermal expansion of the insulative layer be from about 0.9 to about 1.1 times as great as the coefficient of thermal expansion of the layers 12 and 16.

In another embodiment, in which it is desired that layers 12 and 16 be under compression, one may use an insulating layer with a coefficient of thermal expansion of from about 1.1 to about 1.5 times as great as the coefficient of thermal expansion of layers 12 and 16.

When layers 12 and 16 are comprised of or consist of metal titanate, it is preferred that each of them have a coefficient of thermal expansion of from about $1.0 \times 10^{-6}$ per degree Celsius to about $20 \times 10^{-6}$ per degree Celsius.

Subject to the above conditions, substantially any insulative material may be used in layer 14. Thus, by way of illustration, one may use insulating barium titanate. As is known to those skilled in the art, an undoped barium titanate which is titanium rich (as defined above, with the specified titanium/barium atom ratio) may be used in the insulative layer. One also may use an undoped barium titanate which is barium rich, or an undoped barium titanate which has a substantially 1:1 ratio of barium and titanium atoms. Alternatively, or additionally, any of the other metal titanates described above (in either the stoichiometric, titanium-rich, or metal-rich embodiments) also may be used.

Insulating layer 14 may have a thickness 20 of at least about 10 microns and, preferably, at least about 100 microns. As is known to those skilled in the art, the resistance of a material is a function of both its resistivity and its thickness.

It is preferred that insulating layer 14 have a resistance of at least about 1,000 ohms per square centimeter of the area of the sensor (which, in the case of a rectangular area, is its width times its length).

Although, in the embodiment of FIG. 1, a sensor is shown with 3 layers of material, it will be apparent to those skilled in the art that one may also utilize sensors with 4, 5, 6, 7, 8, 9, 10, 11, 12, 13, 14, 15, 16, 17, etcetera layers of material, subject to the conditions that (1) with the exception of the outermost layers, each layer which contains n-type dopant and has PTCR characteristics will be contiguous with at least 1 insulating layer, and (2) each substructure within the sensor which contains an n-type layer, an insulating layer, and another n-type layer will have the same relationships to each other as do layers 12, 14, and 16.

In one embodiment, illustrated in FIG. 1, the two outermost layers are n-type PTCR layers. In another embodiment, not shown, the two-outside layers are insulating layers; in this embodiment, the sensor 10 contains at least 5 layers of material. In yet another embodiment, one of the outermost layers is insulating, and another of the outermost layers is an n-type PTCR layer.

Figure 2:
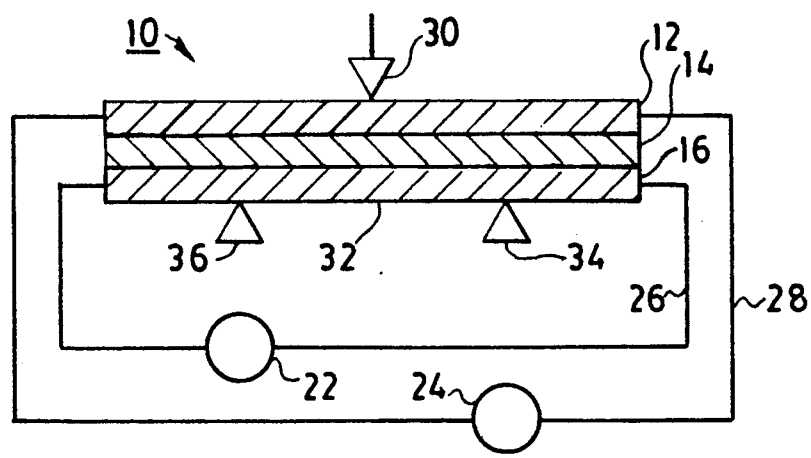
FIG. 2 is a schematic diagram illustrating the use of the sensor of FIG. 1 to measure a change in stress.

FIG. 2 illustrates one means of utilizing the sensor of FIG. 1. Referring to FIG. 2, it will be seen that sensor 10 is electrically connected to ohmmeter 22 and ohmmeter 24, thereby forming two electrical circuits. Ohmmeter 22 is connected via line 26 to layer 16. Ohmmeter 24 is connected via line 28 to layer 12.

It will be apparent to those skilled in the art that, as a force is applied in the direction of arrow 30, layer 12 is under compression, and layer 16 is under tension. The layer 12, which is under compression, will increase its resistance. The layer 16, which is under tension, will decrease its resistance.

Prior to the time that force is applied, it is preferred to construct layers 12 and 16 in a manner such that the difference between the resistance of layer 12 and the resistance of layer 16 is substantially 0 or relatively small. However, once the force is applied, the difference in resistance will increase because each layer will be changing its resistance in a different direction. Thus, a relatively small force applied in the direction of arrow 30 will produce a relatively large change in resistance. It is preferred that the force applied will at least produce a stress of about 15 pounds per square inch ("p.s.i.").

Referring again to FIG. 2, it is preferred to support sensor 10 on its underside by at least two supports which, preferably, are located within a distance from each end which is from about 10 to about 20 percent of the total length of sensor 10. This test configuration is well known to those skilled in the materials testing art as the "three-point bending" test.

It will be apparent to those skilled in the art that sensor 10 may also be tested with a four-point bending configuration (not shown) in which an additional force is applied on the top of surface 12. Similarly, one may use the sensor in a configuration wherein stress is applied on at least four separate portions of the sensor.

Figure 3:
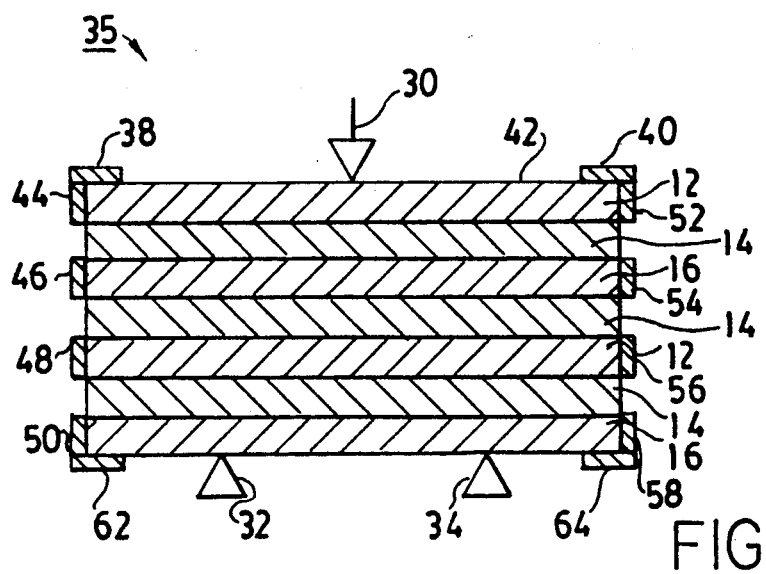
FIG. 3 is a sectional view of another preferred sensor of this invention.

FIG. 3 illustrates a preferred embodiment in which preferred sensor 35 is comprised of seven alternating layers of material. The sensor 35 of this Figure may advantageously be used in the Wheatstone Bridge configuration depicted in FIG. 7.

Referring to FIG. 3, electrodes 38 and 40 are placed on the upper face 42 of sensor 35; electrodes 44, 46, 48, and 50, 52, 54, 56, and 58 are placed on the sides of sensor 35; and electrodes 64 and 62 are placed on the bottom face 60 of sensor 35.

Preparation of the sensor of this invention

Figure 4:
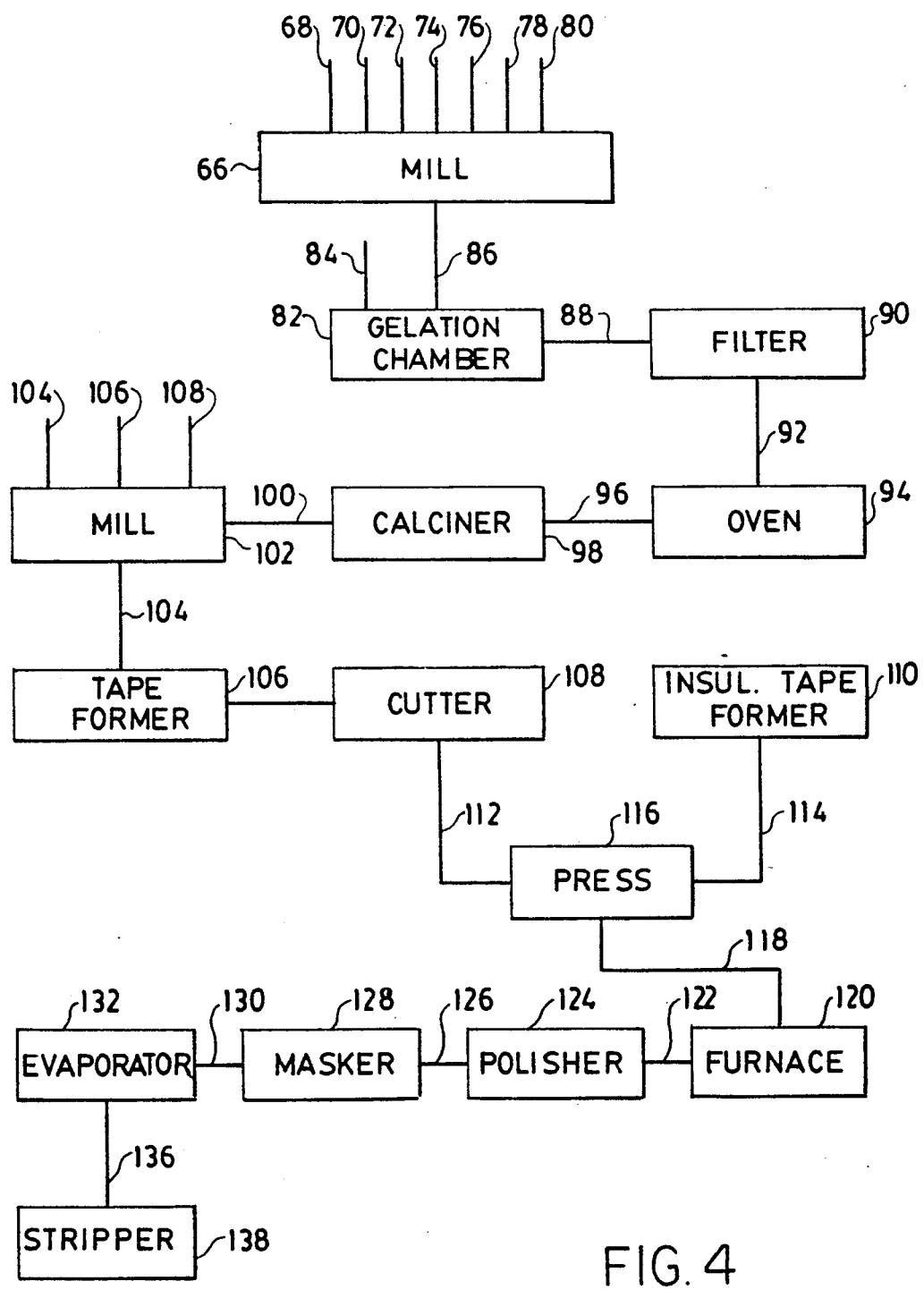
FIG. 4 is a flow diagram illustrating a preferred process for making some preferred sensors of this invention.

FIG. 4 is a flow sheet illustrating a preferred process for preparing one of the laminated sensors of this invention.

In the first step of the process, a powder batch for the PTCR layer 12 and/or 16 is prepared. Although the following description discusses the preparation of this batch for an n-type barium titanate, it will be appreciated by those skilled in the art that the discussion is equally applicable to the preparation of layers 12 and/or 16 from other ferroelectric materials.

To mill 66 is charged via line 68 chemically-prepared, coprecipitated barium titanate powder with a purity in excess of 99.9 percent. In the discussion presented below, it will be assumed that 100 grams of the barium titanate are charged via line 68, and the amounts of the other reagents are based upon this 100 gram charge. This barium titanate material may be obtained, e.g., from the Transelco Division of the Ferro Corporation (Penn Yam, N.Y.) as lot number 90520, code 219-9. It contains a titanium/barium atomic ratio of 1.007 and it has a particle size such that substantially all of its particles are smaller than 50 microns.

To mill 66, via line 70, is charged 100 milliliters of deionized water to which has been added both dopant and counterdopant. The dopant, in one embodiment, is lanthanum nitrate pentahydrate (reagent number 23,855-4 of the Aldrich Chemical Company, Inc. of Milwaukee, Wis.), and 0.534 grams of it are added to the water. The counterdopant, in one embodiment, is manganous chloride (reagent number 2540-04, obtained from the J. T. Baker, Inc. of Phillipsburg, N.J.), and 0.068 grams of it are added to the water.

Mill 66 can be substantially any mill which will produce a homogeneous mixture, such as a laboratory ball mill. The mixture of water and barium titanate in mill 66 should be comminuted for at least about 30 minutes until a homogeneous mixture results.

After the mixture of water and barium titanate has been mixed at least about 30 minutes, an agent adapted to precipitate the dopant is added via line 72. Those skilled in the art are well aware of agents which cause the precipitation of various dopant compounds. Thus, one may use the following as dopant precipitants: ammonium hydroxide, sodium hydroxide, ammonium carbonate, sodium carbonate, potassium carbonate, ammonium oxalate, sodium oxalate, potassium oxalate, ammonium sulfide, potassium sulfide, sodium sulfide, ammonium acetate, sodium acetate, potassium acetate, and the like. In addition, one may also utilize the succinate or the citrate of such alkali metals. In addition, one may also utilize the hydroxide, carbonate, oxalate, acetate, sulfide, succinate, or citrate of other alkali metals such as lithium, rubidium, cesium, and francium.

In general, from about 0.001 to about 10 weight percent of dopant precipitating agent (by weight of barium titanate) is used. Thus, by way of illustration, 0.3 grams of ammonium succinate are added via line 72. The ammonium succinate may be obtained by neutralizing succinic acid (such as catalog number 23,968-2, Aldrich Chemical Company, Inc.) With ammonia.

An agent adapted to precipitate the counter-dopant is added via line 74; from about 0.001 to about 10 weight percent of the counter-dopant precipitating agent (by weight of barium titanate) preferably is used. By way of illustration and not limitation, one may use one or more of the dopant precipitants described above.

Thus, 0.1 grams of ammonium carbonate may be added via line 74 to precipitate the manganous chloride. The ammonium carbonate may be obtained from the Aldrich Chemical Corporation as reagent number 29786-1.

One may add the precipitating agents in powder form. Alternatively, and in one preferred embodiment, the precipitating agents are added in aqueous solution.

A dispersing agent is preferably added via line 76 to maintain the precipitating dopant and counter-dopant in dispersed condition so as to insure maximum uniformity. From about 0.1 to about 5 weight percent of the dispersant may be charged via line 76. Thus, by way of illustration, one may charge 2.5 cubic centimeters of a 40 weight percent aqueous solution of ammonium polyacrylate (sold by the R. T. Vanderbilt Company of Norwalk, Conn. as "DARVAN 821A"). Other dispersing agents which may be used include sodium polyacrylate, potassium polyacrylate, alkali metal citrates such as the citrates of ammonium, sodium, and potassium, alkali metal succinates, and the like.

In one embodiment, the dispersing agent is an alkali metal polyacrylate with a molecular weight of less than about 10,000. In another embodiment, the molecular weight of polyacrylate dispersant is from about 1,400 to about 5,600.

In one preferred embodiment, a viscosity enhancing agent is added via line 78. The function of this agent is to maintain the viscosity of the slurry at least about 10 centipoise during the comminution.

Any of the viscosity enhancing agents known to those skilled in the art may be added via line 78. Thus, one may use polyvinylacetate, polyacrylamide, polyvinylpyrolidone, polycarboxylic acid polymers (such as polyacrylates, polymethacrylates, and the like), etc.

In general, from about 0.1 to about 10 weight percent of the viscosity-enhancing agent (by weight of barium titanate) is added via line 78. In one embodiment, about 3.0 grams of polyvinyl alcohol, 99-100 percent hydrolyzed (sold as reagent number U227-08 by the J. T. Baker Company) may be added via line 78. It is preferred to add this material as a 15 weight percent aqueous solution.

Thereafter, the mixture in mill 66 is comminuted for from about 1 to about 72 hours until a substantially homogeneous suspension is obtained. In one embodiment, the material is milled for about 16 hours.

It is preferred that the viscosity-enhancing agent also have the property of forming a gel upon mixture with another solvent. In cases where such is not the case, however, a gel-forming agent may be added to mill 66 via line 80.

To gelation chamber 82 is added a solvent which, when in contact with the slurry from mill 66, will produce a gel; this solvent may be added via line 84. It is preferred that the solvent added via line 84 be miscible with water, and that the gelling agent present in the slurry should be insoluble in the mixture of water and solvent. Solvents which meet these criteria are well known to those skilled in the art. Thus, when the gelling agent is polyvinyl alcohol, one may use an organic alcohol of low molecular weight such as ethanol, propanol, butanol, and the like. Alternatively, one may use other organic liquids which are miscible with water.

In general, one uses at least about 1 (and preferably at least about 2) parts by weight of solvent per part of water charged to mill 66. Thus, by way of illustration, one may charge 300 milliliters of ethyl alcohol (reagent number 15,190-4, Aldrich Chemical Company).

After the water-immiscible solvent has been charged via line 84, the slurry is discharged via line 86 to gelation chamber 82. Upon contact with the solvent, a gelatinous mass immediately forms.

The gel formed in chamber 82 is then passed via line 88 to filter 90, and the water-solvent mixture is then removed from the gel by filtration. Any of the filters known to those skilled in the art may be used. Thus, by way of illustration, one may use the filtration apparatuses disclosed on pages 19-58 to 19-88 of Robert H. Perry and Cecil H. Chilton's "Chemical Engineers Handbook," Fifth Edition (McGraw Hill Book Company, New York, 1973. For example, one may use a filter press, gravity filtration, and the like. In one embodiment, a Buchner filter is used.

After filtration, the filter cake remaining in filter 90 contains at least about 85 percent of solid material.

This filter cake is then passed via line 92 to oven 94, in which it is preferably dried to a moisture content of less than about 1.0 weight percent. In one embodiment, the filter cake is dried at a temperature of about 105 degrees Celsius for about 1 hour.

In another embodiment, not shown, instead of passing the slurry to gelation chamber 82 and thereafter drying the gel so formed, one may pass the slurry to a spray drier (not shown) which will dry the slurry and, if the temperature used is high enough, calcine the dried powder.

Referring again to FIG. 4, the dried filter cake is then passed via line 96 to calciner 98, in which it is subjected to a temperature sufficient to burn out organic material and to produce a powder. In the calciner, the filter cake is preferably subjected to a temperature of from about 200 to about 1,000 degrees Celsius until it contains less than about 1.0 weight percent of organic matter. It is preferred to calcine the filter cake at a temperature of from about 400 to about 700 degrees Celsius for from 1 to about 10 hours.

The calcined powder may be dry-pressed into a green body. Alternatively, it may be first mixed with a binder and then formed into a green body. This latter embodiment is described below.

The calcined powder is then preferably passed via line 100 to mill 102. Organic binder is added to mill 102 via line 104. In general, from about 10 to about 50 weight percent of binder (by total weight of binder and calcined powder is added to mill 102.

Any of the green body binders known to those skilled in the art may be added via line 104. Thus, one my use the binders described on pages 36-37 of the January, 1991 issue of Ceramic Industry.

By way of illustration, the green body binders include microcrystalline cellulose, natural gums (such as Xanthan gum, gum arabic), polysaccharides (such as refined starch, dextrine), organic silicates (such as ethyl silicate), lignin extracts (such as paper waste liquor), refined alginate (such as sodium alginate, ammonium alginate, and the like), soluble aluminates (such as sodium aluminate), cellulose ethers (such as methyl cellulose, hydroxyethyl cellulose, sodium carboxymethyl cellulose, and the like), polymerized alcohols (such as polyvinyl alcohol), polymerized butyral (such as polyvinyl butyral), acrylic resins (such as polymethyl methacrylate), glycols (such as polyethylene glycol), waxes (such as paraffin, wax emulsions, microcrystalline waxes), abopon, ammonium alum, tannic acid, lignosulfonates, magnesium-aluminum silicate, and the like.

In one preferred embodiment, the binder used is polyvinylbutyral. One polyvinylbutyral binder is polyvinylbutaryl mixed with toluene and ethanol solvents; this binder is available from Metaramics Sciences Inc. of Carlsbad, Calif. as product number B-73210.

To the mill 102 is charged 52 grams of such binder. To mill 102 is also added, via line 106, from about 0.1 to about 10 percent of plasticizer. Any of the commonly known plasticizers may be used such as, for example, ethylene glycol, diethylene glycol, triethylene glycol, tetraethylene glycol, polyethylene glycol, polyalkylene glycol, glycerol, dibutylphthalate, dimethylphthalate, and the like. Thus, in one preferred embodiment, about 1.5 grams of polyalkylene glycol (sold by the Metaramics Science Inc. as product number M-1111) may be used.

Grinding media is added to mill 102 via line 108. It is preferred to use yttria-stabilized zirconia media which is charged at a weight/weight ratio of about 2 to about 10 parts media per part of solid. In one embodiment, the media/batch weight/weight ratio is about 5:1.

The mixture in mill 102 is then milled for from about 1 to about 72 hours (and, preferably, from about 10 to about 24 hours) until a substantially homogeneous suspension is produced.

The homogeneous suspension from mill 102 is then passed via line 104 to tape former 106. Any of the means for forming tape may be used, such as, e.g., tape casting. As is known to those skilled in the art, tape casting is the process of forming a film of controlled thickness when a slurry flows down an inclined substrate or under a blade onto a supporting surface. The process is generally referred to as continuous tape casting when the blade is stationary and the supporting surface moves, and batch doctor blade casting when the blade moves across the stationary, supporting surface covered with slurry. See, for example, pages 396-397 of James S. Reed's "Principles of Ceramic Processing" (John Wiley and Sons, New York, 1988).

In one preferred process, tape former 106 is a doctor blade tape former. The tape formed in this process is allowed to dry until it preferably contains less than about 5 percent of solvent.

The tape formed in tape former 106 is then passed to cutter 108, in which the tape is cut into the appropriate size. In one embodiment, the tape is cut into rectangles 65 millimeters in length by 8 millimeters in width.

By a process substantially identical to the one described above, a tape is made of the insulating material. However, in this latter process, one will not use either a dopant, a counter dopant, a precipitant for the dopant, or a precipitant for the counter dopant. One may, however, use the same barium titanate starting material. Alternatively, one any use a different insulating material.

For the purpose of brevity, all of the steps used to make the insulating tape material will not be described or illustrated. It will be apparent to those skilled in the art that, in FIG. 4, reference to the "insul. tape former" indicates a process with similar milling and tape casting operations; inasmuch as no dopant or counterdopant are involved in this part of the process, gelation, filtration, drying, and calcining steps are not required.

The PTCR tape from cutter 108, and the insulating tape, from cutter 110, are then passed via lines 112 and 114, respectively, to a die 116 in which layers of PTCR tape and insulating tape are preferably alternated. After the tape is put into the press, it is heated to a temperature of from about 25 to about 100 degrees Celsius (and preferably from about 40 and 90 degrees Celsius). After it has reached the desired temperature, it is pressed, usually at a pressure of from about 2,000 to 50,000 p.s.i. It is preferred that pressure used be from about 10,000 to about 15,000 p.s.i.

In one embodiment, not shown, the lamination of the tapes occurs in a self-heating die.

The green body formed in press 116 is then passed via line 118 to furnace 120, in which is it sintered. The sintering may be conducted in air. However, it is preferred to conduct the sintering using different atmospheric environments at different stages of the sintering cycle.

In one preferred embodiment, the green body is first heated from ambient to about 1,300 degrees Celsius under an air environment. During this stage, which may occur over a period of from about 4 to about 200 hours, the organic material is removed from the green body.

It is preferred to raise the temperature of furnace 120 at a rate of no more than about 100 degrees Celsius per hour, until the green body is at a temperature of about 700 degrees Celsius. It is more preferred that such heating rate be lower than about 50 degrees Celsius per hour. It is even more preferred that the heating rate be lower than about 12 degrees Celsius per hour.

After the green body has been heated to a temperature of about 700 degrees Celsius, it is then raised to a temperature of about 1,300 degrees Celsius under air atmosphere at a heating rate which generally is in excess of the heating used during the first part of the cycle. Although one may use the lower heating rate, one may also use a heating rate of up to about 500 degrees Celsius per hour. In one embodiment, a heating rate of about 300 degrees Celsius per hour is used to raise the temperature in about 2 hours from 700 to 1,300 degrees Celsius.

Once the green body has been raised to a temperature of 1,300 degrees Celsius, then it is blanketed with an environment which is substantially oxygen-free and, preferably, tends to react with oxygen produced by the green body. Thus, one may use inert gas (such as argon, krypton, neon), one may use nitrogen, one may use mixtures of nitrogen and hydrogen, one may use mixtures of inert gas and hydrogen, one may use mixtures of carbon dioxide and carbon monoxide, one may use mixtures of nitrogen and ammonia, one may use materials which produce such gas(es), and the like. In one embodiment, an environment of pure nitrogen is used. Whichever gaseous atmosphere is used, it is preferred that it maintain the partial pressure of oxygen (which is being produced during this sintering) at below about 1 Torr.

Alternatively, or additionally, one may use vacuum instead of and/or with the oxygen-deficient gas. In general, when vacuum is used, it is preferred that a pressure of less than about 1 Torr be used.

After the material has been blanketed with the oxygen-deficient gas, the temperature of the green body is then raised from about 1,300 to about 1,500 degrees Celsius at a preferred rate of from about 100 to about 500 degrees Celsius per hour, and more preferably, about 300 degrees Celsius per hour. The heating rate at this stage of the cycle is not critical, and lower or higher rates may be used.

Once the green body has reached its desired temperature of from about 1,300 to about 1,500 degrees Celsius, it is maintained under the same gaseous environment and/or vacuum and at substantially this temperature for from about 1 minute to about 10 hours and, preferably, for at least about 30 minutes; it is believed that grain growth occurs during this portion of the cycle. Thus, by way of illustration, once the green body has reached a temperature of 1,400 degrees Celsius, it is maintained at about 1,400 degrees Celsius for one hour while under nitrogen atmosphere.

After the green body has been maintained under the oxygen-deficient conditions for the required time, the body is then cooled while it is contacted with an oxidizing atmosphere. The oxidizing atmosphere may contain oxygen, air, ozone, halogens (such as fluorine), halides, nitrogen trifluoride, nitrous oxide, and the like.

In one preferred embodiment, pure oxygen is used.

The sintered body may be cooled down to ambient. Alternatively, it may be cooled at to a temperature in excess of ambient such as, e.g., 500 degrees Celsius, or 1100 degrees Celsius, etc. What is important is that, during the cooling, the sintered body be exposed to the oxidizing atmosphere and that such exposure be sufficient, together with the cooling, to increase the oxidation state of the grain boundary region of the sintered body.

During this cooling step, it is important not to cool the sintered body at a rate substantially in excess of 1,000 degrees Celsius per hour. It is preferred that the cooling rate be less than about 500 degrees Celsius per hour and, more preferably, less than about 300 degrees Celsius per hour.

Furthermore, during the cooling step, it is preferred that the sintered body be at a temperature of from about 1,500 to about 1,000 degrees Celsius for at least about 1 hour.

The furnace 120 may then be allowed to cool in air. Thereafter, the sintered laminate is then removed from the furnace and passed via line 122 to polisher 124. The exterior surfaces of the sintered body are polished to a finish of from about 1 to about 100 microns. One may use any polishing means known to those skilled in the art such as, for example, silicon carbide grit paper.

The polished material is then passed via line 126 to masker 128, in which masking agent is applied to those surfaces of the material on which it is not desired to deposit an electrode. Any suitable masking agent may be used. Thus, for example, one may use nail polish comprised of organic solvent and polymethylmethacrylate polymer.

The polished, masked, sintered body is then passed via line 130 to evaporator 132. In evaporator 132, a gaseous material which forms an electrically conductive solid upon cooling is used. Thus, one may evaporate aluminum, chromium, gold, palladium, or other conductive metals upon the unmasked surfaces of the object. Aluminum is a preferred electrically conductive material.

After the evaporation step has been completed, the sensor is then passed via line 136 to stripper 138 in which the masking agent is removed from the sensor by the application of a suitable solvent.

Transducers comprising of the laminated sensor

Figure 5:
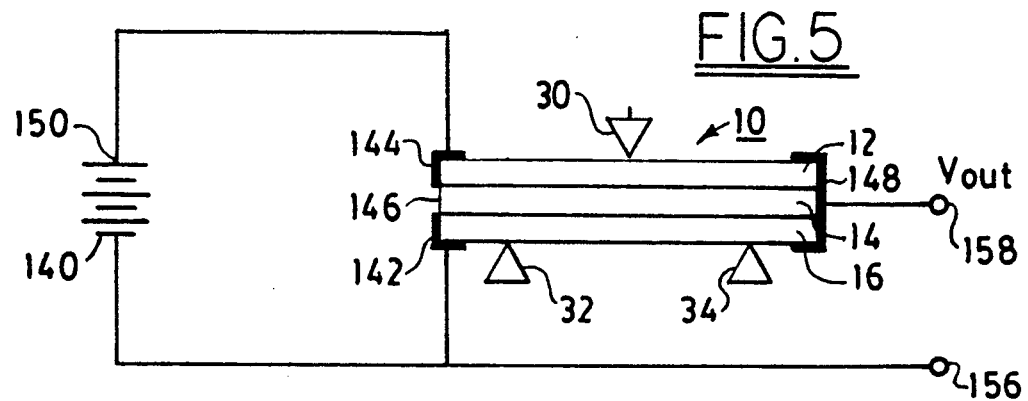
FIGS. 5, 5A, 6, and 7 each illustrate a transducer comprised of the sensor of this invention.

FIG. 5 illustrates one means of utilizing the laminated sensor 10 of this invention.

Referring to FIG. 5, it will be seen that a source of direct voltage is applied between electrodes 142 and 144 on sensor 10 on input face 146 of the sensor 10; and the output voltage developed output face (which is an electrode which coats the output portion of the sensor) and the negative end 150 of the voltage source 140 is measured.

Figure 5A:
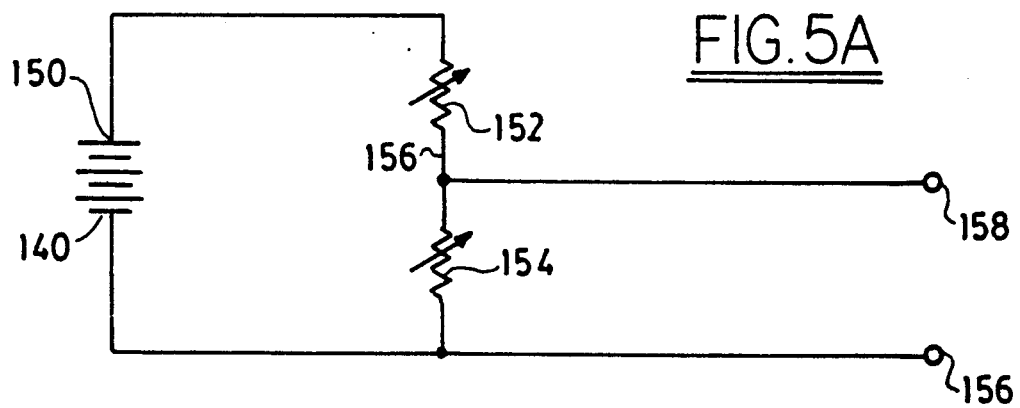

The circuit which the device of FIG. 5 is comparable to is illustrated in FIG. 5A. Because each of layers 12 and 16 are separated by insulating layer 14, these layers electrically equivalent to variable resistors 152 and 154 (whose resistance varies with stress). Because the two layers 12 and 14 are joined by electrode 148, there is an electrical path 156 between them. Thus, in this configuration, layers 12 and 16, in combination, act as voltage divider. As pressure is applied to sensor 10, the electrical characteristics of one or more of the components of circuit 5A (such as the resistance of resistors 152 and 154 and/or the voltage drop across each of said resistors) will vary.

In general, when the sensor of this invention is applied to a source of electric current and a stress of at least 15 p.s.i. is applied to the sensor, the electrical characteristics of at least one of the components of the circuit formed by the sensor, the voltage source, and any other component present, will vary. Thus, there may be a change in the resistance of a component, the capacitance of a component, the current through a component, the voltage drop across a component, and the like.

Referring again to FIG. 5A, the voltage drop across these devices, which are effectively connected in series, is equal to the current times the resistance of the device.

The output of the device is measured across leads 156 and 158. Thus, the output is effectively measuring the voltage drop across layer 16 ("variable resistor 154").

The voltage drop across layer 16 will depend upon two factors: the voltage drop across layer 12 (for the total voltage drop is equal to the applied voltage), and the resistance of layer 16.

When force is applied in the direction of arrow 30, both of the aforementioned factors combine to substantially decrease the voltage drop across layer 16. This force, as is indicated elsewhere in the specification, will place layer 12 in compression and layer 16 under tension.

The n-type PTCR material made by the process of this invention has the property, when it is subjected to compressive stress (such as, for example, hydrostatic pressure) of increasing its resistance substantially. However, this same material, when it is subjected to tensile stress (such as bending), has the property of decreasing its resistance substantially. Thus, one layer of this material can be used to differentiate between compressive and tensile stress.

Figure 6:
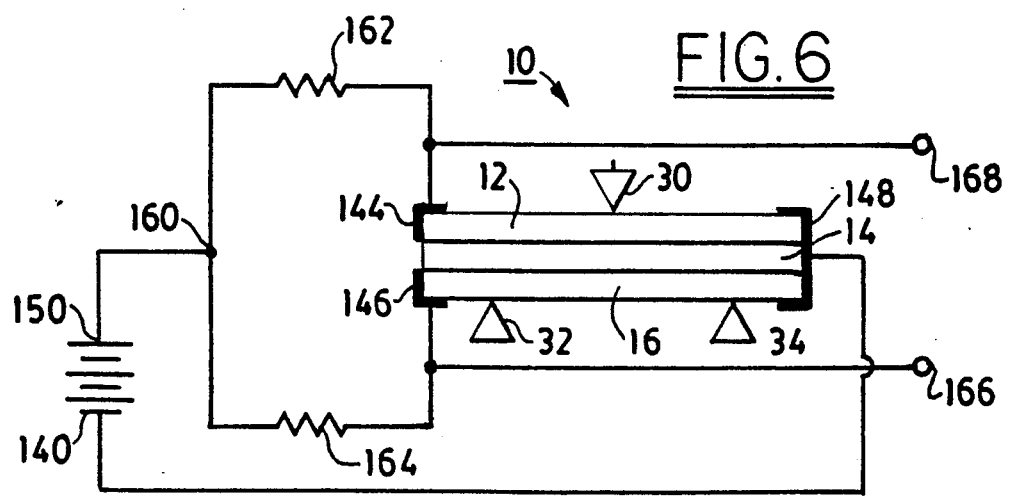

FIG. 6 illustrates another transducer utilizing sensor 10, which is in a "Wheatstone Bridge" configuration. Referring to FIG. 6, it will that the current from voltage source 140 flows (with conventional current flow, from plus to minus) to point 160, at which point it divides into two parallel branches; the same voltage drop occurs across each parallel branch.

The first parallel branch consists of fixed resistor 162 and the "variable resistor" of layer 12, whose resistance varies with applied force. The second parallel branch consists of fixed resistor 164 and the "variable resistor" of layer 16, whose resistance varies with applied force.

The output of this Wheatstone Bridge device is measured across points 166 and 168.

As force is applied in the direction of arrow 30, the resistance of layer 12 increases, and the voltage drop across layer 16 also increases. Inasmuch as the voltage drop across the branch containing resistor 162 and layer 12 is equal to the applied voltage, the voltage drop across resistor 162 must decrease; and thus the voltage read at point 168 also must increase.

Conversely, as force is applied in the direction of arrow 30, the resistance of layer 16 decreases, the voltage drop across layer 16 decreases, the voltage drop across fixed resistor 164 increases, and the voltage at point 166 decreases.

Thus, because of these two effects, when force is applied in the direction of arrow 30, the difference in potential between points 166 and 168 increases substantially.

It will be apparent to those skilled in the art that, as the pressure applied in the direction of arrow 30 varies, the reading across points 166 and 168 also will vary.

Figure 7:
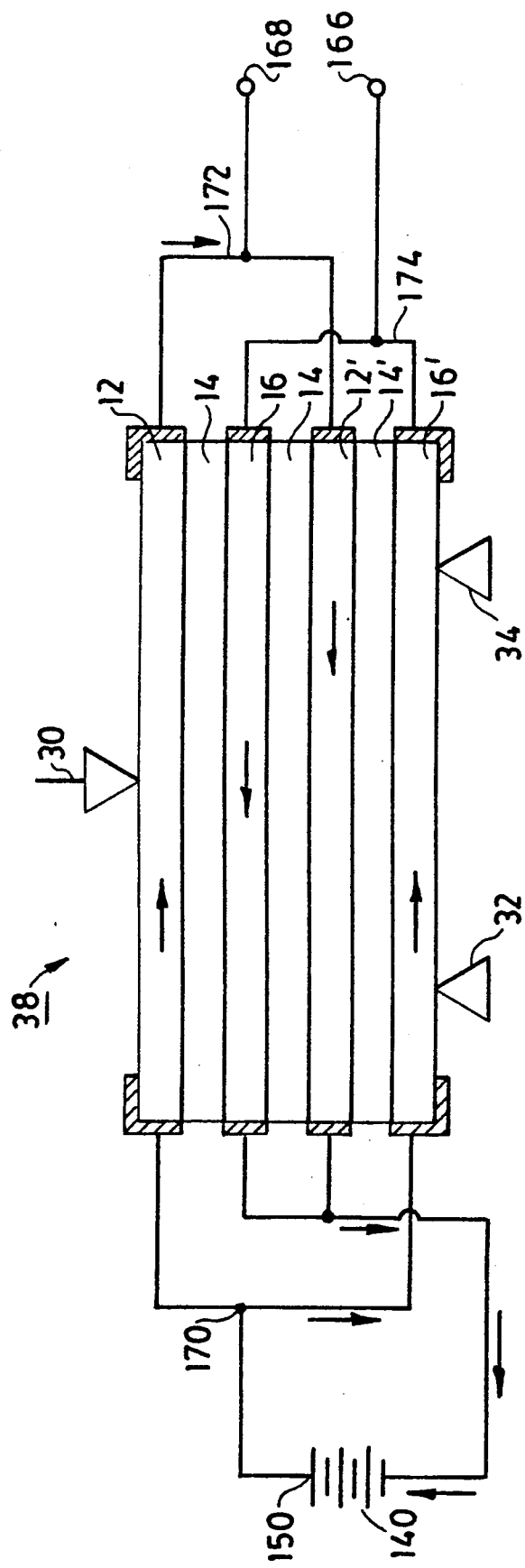

FIG. 7 is a transducer comprised of the sensor 35 of FIG. 3. It illustrates the point that, the greater the number of alternating layers of PTCR and insulator, the large the signal which can be generated with a specified stress.

When pressure is applied in the direction of arrow 30, this stress is transmitted throughout sensor 35. The top half of sensor 35 is in compression; and the bottom half of sensor 35 is in tension. Thus, the resistance of each of layers 12 and 16 increases; and the resistance of each of layers 12' and 16' decreases.

Layer 12 is compressed more than layer 16, and its resistance thus increases more. Layer 16' is in tension more than layer 12', and thus its resistance decreases more.

Consequently, when stress is applied in the direction of arrow 30, layer 12 will have the maximum resistance, layer 16 will have the next largest resistance, layer 12' will have the next largest resistance, and layer 16' will have the smallest resistance.

In a parallel circuit, the current will tend to flow across the branch the lowest resistance.

Current flows from positive terminal 150 to point 170, at which it splits into two branches. The voltage in each of these branches is equal, but the current in each branch will vary with the total resistance of the branch.

In one branch, current flows from point 170 through layer 12 through line 172 to layer 12' and back to voltage source 140. The total resistance in this branch is the sum of the resistances of layer 12 (which is maximum under stress) and layer 12' (which is next to the minimum under stress).

In another branch, current flows from point 170 through layer 16' through line 174 and through layer 16 back to voltage source 140. When force is applied in the direction of arrow 30, the resistance of layer 16' is the smallest, and the resistance of layer 16 increases less than the resistance of layer 12. Thus, the total resistance of this branch will increase less than the resistance of the other branch.

The output voltage from the first branch is measured at point 166. Inasmuch as the resistance of this branch increases under stress, the current through the branch decreases, and thus the voltage drop across this branch also decreases, resulting in a lower reading at point 166.

The output voltage from the second branch is measured at point 168. Inasmuch as the resistance of this branch increases less under stress, more current will tend to flow through this branch than through the first branch, the voltage drop across the branch will be greater, and the reading at point 168 will be greater.

Preparation of a sensor in monolayer form

In one embodiment, not shown, a process is provided in which the sensor produced consists only of the aforementioned PTCR material. Thus, referring again to FIG. 1, one undergoes the milling, gelation, filtering, drying, calcining, milling, and tape forming steps described above for the preparation of the n-type PTCR material. In this embodiment, however, the PTCR material is not combined with or laminated with an insulating material; it is formed into a green body, sintered, polished, masked, and otherwise treated as described above.

In another embodiment, not shown, the aforementioned sensor is made by a process which does not involve the gelation step. A spray-drying step is substituted for the gelation and drying steps. Thereafter, the process may proceed as before. Calcined powder may be produced. Thereafter, one may either mix the calcined powder with binder and thereafter form a green body; or, alternatively, one may dry press the calcined powder.

The body formed by this process may be substantially any shape such as a bar, a disk, a diaphragm, and the like.

In one aspect of this embodiment, it is preferred to produce a sintered body which has an average grain size in excess of about 1 micron.

In one preferred embodiment, and in substantial accordance with the procedure described above, a disc-shaped monolayer sensor is prepared.

The monolayer material made by the process of this invention may be of any shape such as a disc shape, a square shape, a rectangular shape, an irregular shape, and the like.

Figure 8:
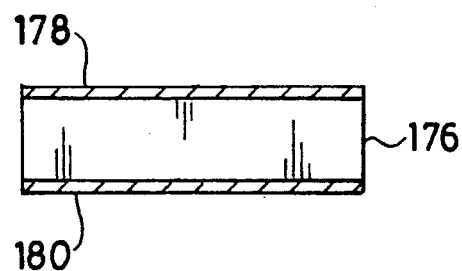
FIG. 8 is a side view of a monolayer sensor of this invention.

In the embodiment illustrated in FIG. 8, the sensor 176 is in the shape of a disc. In the manner described above, electrodes 178 and 180 are deposited on its surfaces. As will be apparent to those skilled in the art, sensor 176 may be loaded axially, in compression or in tension.

Figure 9:
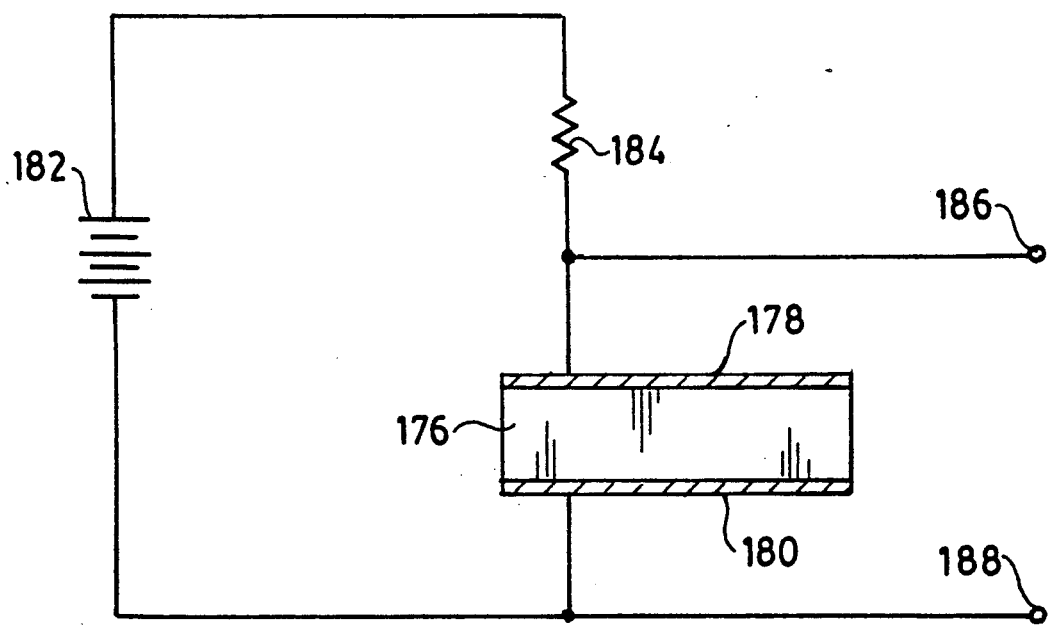
FIG. 9 illustrates one use of the a monolayer sensor of FIG. 8 as a transducer.

FIG. 9 illustrates the sensor 176 being used as a transducer. In the circuit illustrated in FIG. 9, direct current from current source 182 flows through fixed resistor 184 and variable resistor 176; and the output of the circuit is measured across leads 186 and 188. As a stress of at least about 15 p.s.i. (not shown) is applied to sensor 176, its resistance decreases, the voltage drop across the sensor 176 decreases, and the voltage measured across leads 186 and 188 decreases.

Other embodiments utilizing sensor 176 will be readily apparent to those in the art. Thus, for example, one may measure the voltage across fixed resistor 184.

It will be readily apparent to those skilled in the art that applicants' novel sensors can be used with commercially available load translation means to provide novel pressure sensors. Thus, referring to FIG. 7, load can be applied in the direction of arrow 30 by the use of conventional mechanical means for translating force from a load into pressure directed against the surface of the sensor 10.

In general, when applicants' novel sensors are used in a transducer, a stress of at least 15 p.s.i. is applied the sensor at least one point on its surface. It is preferred to use a stress of at least about 50 p.s.i. applied at least two points on its surface.

The following examples are presented to illustrate the preferred embodiments of the invention but are not to be deemed limitative thereof. Unless otherwise specified, all parts are by weight, and all temperatures are in degrees centigrade.

Example 1: Preparation of Monolayer Sensor

To a laboratory ball mill with a capacity of 1,000 milliliters were charged 100 grams of chemically-prepared, coprecipitated barium titanate powder with a purity in excess of 99.9 percent; this material was obtained from the Transelco Division of the Ferro Corporation (Penn Yam, N.Y.) as lot number 90520, code 219-9. It contained a titanium/barium atomic ratio of 1.007 and it had a particle size such that substantially all of its particles were smaller than 50 microns.

To the laboratory ball mill also were charged 100 milliliters of deionized water to which had been added both dopant and counterdopant. The dopant was lanthanum nitrate pentahydrate (reagent number 23,855-4 of the Aldrich Chemical Company, Inc. of Milwaukee, Wis.), and 0.534 grams of it were added to the water. The counterdopant was manganous chloride (reagent number 2540-04, obtained from the J. T. Baker, Inc. of Phillipsburg, N.J.), and 0.068 grams of it were added to the water.

The mixture of water and barium titanate in the mill was comminuted for 24 hours at a speed of about 45 revolutions per minute. Thereafter, 0.3 grams of ammonium succinate and 0.1 grams of ammonium carbonate also added to the mixture.

Dispersing agent was then added to the reaction mixture. 2.5 cubic centimeters of a 40 weight percent aqueous solution of ammonium polyacrylate (sold by the R. T. Vanderbilt Company of Norwalk, Conn. as "DARVAN 821A") were added.

A viscosity-enhancing agent next was added, in the form of 3.0 grams of polyvinyl alcohol, 99-100 percent hydrolyzed (sold as reagent number U227-08 by the J. T. Baker Company) in a 15 weight percent aqueous solution.

The reaction mixture was thereafter comminuted in the ball mill at a speed of about 45 revolutions per minute for 24 hours.

To a "PYREX" tray with a capacity of about 1.5 liters were charged 300 milliliters of ethyl alcohol (reagent number 15,190-4, Aldrich Chemical Company). Thereafter, the slurry was poured into the tray; a gel formed upon contact.

The gel was then poured through a Buchner filter equipped with filter paper; the filter had a capacity of about 500 cubic centimeters. The filtrate was discarded.

The filter cake material was then charged to an alumina crucible, and the crucible was then placed into an electric oven. Drying of the filter cake was conducted in air at a temperature of 105 degrees Celsius for one hour.

The dried filter cake was allowed to cool and thereafter removed from the oven. Then it was placed into an electric box furnace wherein, while under air atmosphere, it was heated to a temperature of 600 degrees Celsius for 2.0 hours.

The calcined powder was then dry-pressed in a Carver Laboratory Press. It was charged into a cylindrical die with an internal diameter of 17.5 millimeters and a depth of 15 centimeters; the die was equipped with both upper and lower plungers. Pressing occurred at a pressure of 12,000 p.s.i., and it produced a disc with a thickness of 3 millimeters.

The pressed disc was then transferred to an alumina tube furnace, wherein it was subjected to a heat-treatment cycle.

In the first step of the heat-treatment, the green body was heated from ambient to about 1,300 degrees Celsius under an air environment at a heating rate of about 300 degrees Celsius per hour. Once the green body had been raised to a temperature of 1,300 degrees Celsius, it was blanketed with nitrogen.

Thereafter, while still under nitrogen atmosphere, the temperature of the green body was then raised to 1,400 degrees Celsius over a period of 20 minutes. The green body was then maintained under these conditions for one hour.

After the green body has been maintained under the oxygen-deficient conditions for the one hour, the body was then cooled to a temperature of 500 degrees Celsius at a rate of 300 degrees Celsius per hour while it was contacted with oxygen, which was caused to flow over the body at a rate of 2.0 liters per minute. Thereafter, it was allowed to cool to ambient in air environment over a period of 6 hours.

The sintered, cooled body was then removed from the tube furnace. Its surfaces were then ground with 600 grit silicon carbide grit paper.

Aluminum was then deposited onto the upper and lower surfaces of the sintered body. The sintered body was placed into a vacuum evaporator, and its top surface was then contacted with aluminum vapor. The process was then repeated for the bottom surface of the body.

The sintered body was formed into a sandwich structure which was then placed into a Carver Laboratory Press (model M, Fred Carver Company, Menomonee, Wis.) equipped with two heating plates (model no. 2108-1, Fred Carver Company. The body was disposed between two aluminum slabs, and two glass slides (each with a thickness of about 1 millimeter) were placed on top of the aluminum slabs. The test "sandwich" thus formed contained a top insulating glass slide, a conductive aluminum slab, the sintered body, a bottom conductive aluminum slab, and a bottom insulating glass slide.

The aforementioned sandwich was then placed between the heating plates of the press, which were then closed to secure it. Electrical wire was then connected to the aluminum slabs; and the wire was then attached to a Keithly Digital Multimeter (model number 195, Keithly Company, Cleveland Ohio). The multimeter, which is was equipped with batteries, measured the resistance of the sample, between its top and bottom surfaces.

The Carver Press was connected to a Thermoelectric 400 Controller (model number 400, Fred Carver Company) which controlled the temperature of the heating plates and, consequently, of the sample.

Figure 10:
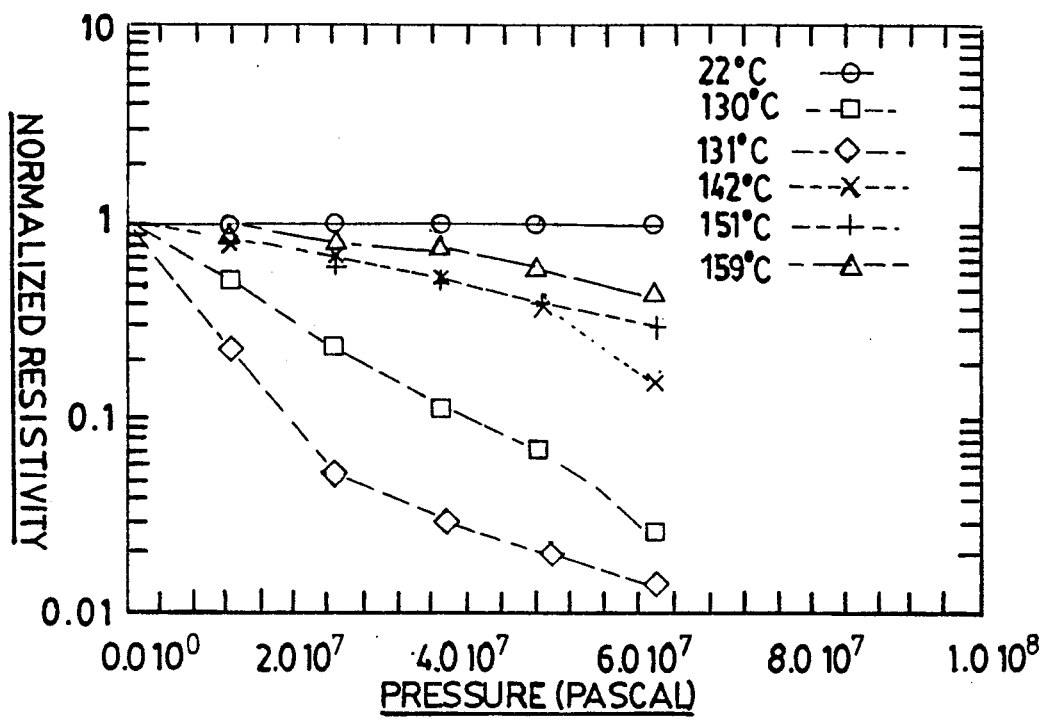
FIG. 10 is a graph illustrating how the resistivity of the monolayer sensor of Example 1 of this case varies with pressure and temperature.

The resistivity of the sintered sample, at different pressures and temperatures, is shown in FIG. 10. It will be noted that, at a given temperature and pressure, the monolayer sample often had a response which was substantially larger than the response of prior art sensors.

Comparative Example 2

A commercially available PTCR body was prepared by the Texas Instruments Corporation of Dallas, Tex. This body was disc-shaped, with a diameter of 12 millimeters and a thickness of about 15 millimeters. It consisted essentially of barium titanate and strontium titanate in a 95/5 mole ratio; it had a Curie temperature of about 100 degrees Celsius; it had a room temperature resistivity of about 60 ohm-centimeters; and it had a maximum resistivity of 107 ohm centimeters at 240 degrees Celsius.

Figure 11:
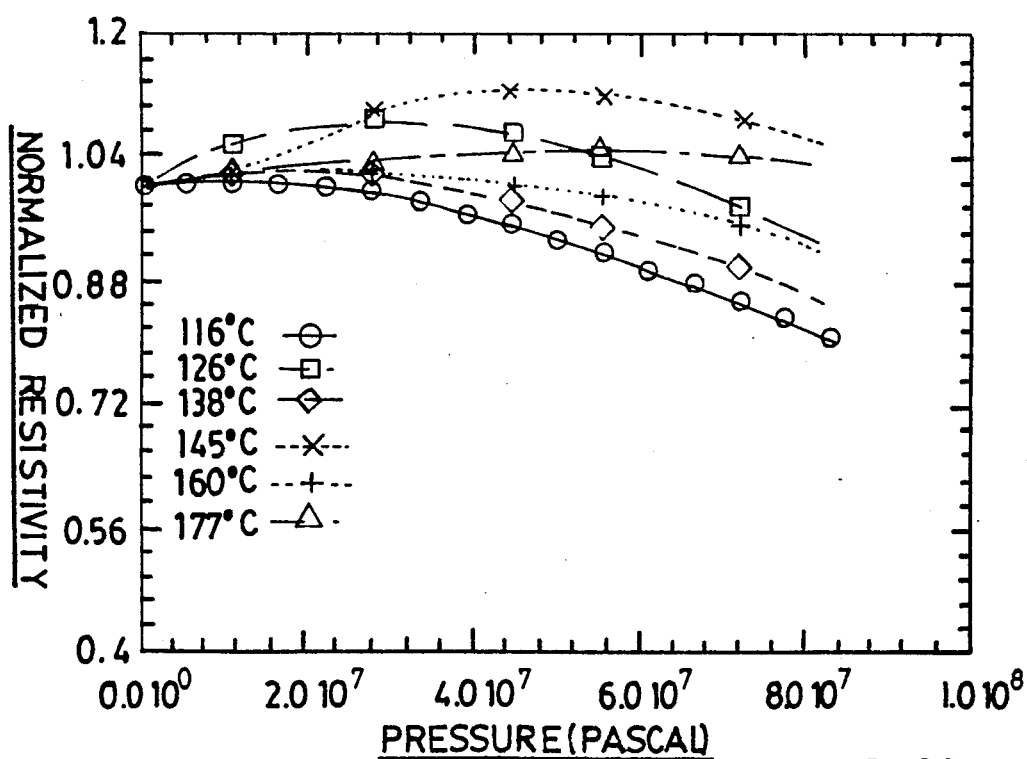
FIG. 11 is a graph illustrating how the resistivity of the sensor of Example 2 of this case varies with temperature and pressure.

In substantial accordance with the procedure of Example 1, the resistivity properties of this sample at different pressures and temperatures was measured using the Carver press, the Keithly multimeter, and the sintered body/aluminum slab/glass sandwich structure. The results of this experiment are presented in FIG. 11.

Example 3

In substantial accordance with the procedure of Example 1, the dried filter cake was prepared by the procedure described in Example 1 and was thereafter calcined by heating it to a temperature of 600 degrees Celsius for 2.0 hours. A dried filter cake was produced in accordance with the procedure of Example 1 from doped barium titanate. The production of a laminate comprised of doped barium titanate will be described below, it being understood that substantially the same procedure is used for the production of the laminate comprised of undoped barium titanate.

100 grams of the calcined powder were produced as described above were then mixed with 40 grams of a polyvinylbutyral binder (available from Metaramics Sciences Inc. as product number B-7320) and 1.1 grams of polyalkylene glycol plasticizer (available from Metamerics Sciences Inc. as product number M-1111). This mixture was then charged to a laboratory ball mill equipped with yttria-stabilized zirconia media (at a weight/weight ratio of 5/1 ) and was milled for 18 hours at a speed of 45 revolutions per minute.

The slurry produced by the ball milling was then formed into tape by doctor blade casting on a glass surface. The slurry on the glass surface was allowed to dry under ambient conditions for 90 minutes. Thereafter it was manually cut into rectangles which were 65 millimeters long and 8 millimeters wide; these rectangles had a thickness of about 0.1 millimeters.

The procedure of this Example was repeated in order to make similar rectangles out of as-received, undoped barium barium titanate (obtained from the Transeclo Division). A tape was made in exactly the same manner as described above for the PCTR tape wit the exception that the barium titanate did not contain any dopants.

A three-layer laminate which contained the doped barium titanate layers on top and on bottom, and the undoped barium titanate layer in the middle, was prepared. A rectangular die which was 65 millimeters long by 8 millimeters wide, was used. Alternating layers of the doped barium titanate rectangle (bottom layer), the undoped barium titanate layer (middle layer), and the doped barium titanate layer (top layer) were charged to the die. Thereafter, these layers were heated to a temperature of 50 degrees Celsius while pressure was applied to both the top and the bottom layers with the use of punches which also were rectangularly shaped with dimensions substantially identical to those of the die. A pressure of 12,000 pounds per square inch was applied during the pressing for about 3.0 minutes while the materials being pressed were subjected to a temperature of 50 degrees Celsius.

The pressed laminate thus produced was then removed from the die and heated in the furnace described in Example 1. The temperature of the furnace was raised from ambient to 100 degrees Celsius in air over a period of four hours. Thereafter, the temperature was raised from 100 degrees Celsius to 640 degrees Celsius in air over a period of 90 hours. Thereafter, the temperature was increased to 1,400 degrees Celsius over a period of 2.5 hours; until a temperature of 1,300 degrees Celsius had been reached, the material was heated in air; but from 1,300 to 1,400 degrees Celsius the material was contacted with nitrogen at a flow rate of 2.0 liters per minute. Thereafter, the material was maintained at 1,400 degrees Celsius for 1.0 hour under nitrogen flowing at a rate of 2.0 liters per minute. Thereafter, the material was cooled to 500 degrees Celsius over a period of 3.0 hours while being subjected to an atmosphere of oxygen flowing at a rate of 2.0 liter per minute. Thereafter, the material was allowed to furnace cool to ambient over a period of about 9 hours while being subjected to an atmosphere of oxygen flowing at a rate of 2.0 liters per minute.

The laminated sensor was removed from the furnace. Thereafter, in substantial accordance with procedure described in Example 1, it was polished, masked, and aluminum electrodes were evaporated onto its surfaces.

The sensor then was placed into an Instron "Table Model" "Universal Testing Instrument" model 1123) which was equipped with an environmental chamber(-catalog number G-30-2) which was equipped with means for controlling the temperature of the sample. The sample was loaded in accordance with the procedure described in Catalog 1-1, "Instron Instruments and Equipment for Advanced Materials Testing" (Instron Corporation, 2500 Washington Street, Canton, Mass. 1966).

Teflon-coated wires were connected from two of the Keithly Multimeters described in Example 1 to the electrodes on the laminated sensor; these multimeters were located outside of the environmental chamber. One set of wires was connected to the top layer to measure its resistance, and one set of wires was connected to the bottom layer in order to measure its resistance.

Within the environmental chamber, the sample was subjected to a standard four-point bend test. The two lower supports were 35 millimeters apart, and the two push rods were 15 millimeters apart. During the application of the load, the sample was heated to a constant temperature of 135 degrees Celsius. The resistance of the upper and lower layers of the laminate were continually monitored during the application of the load.

Figure 12:
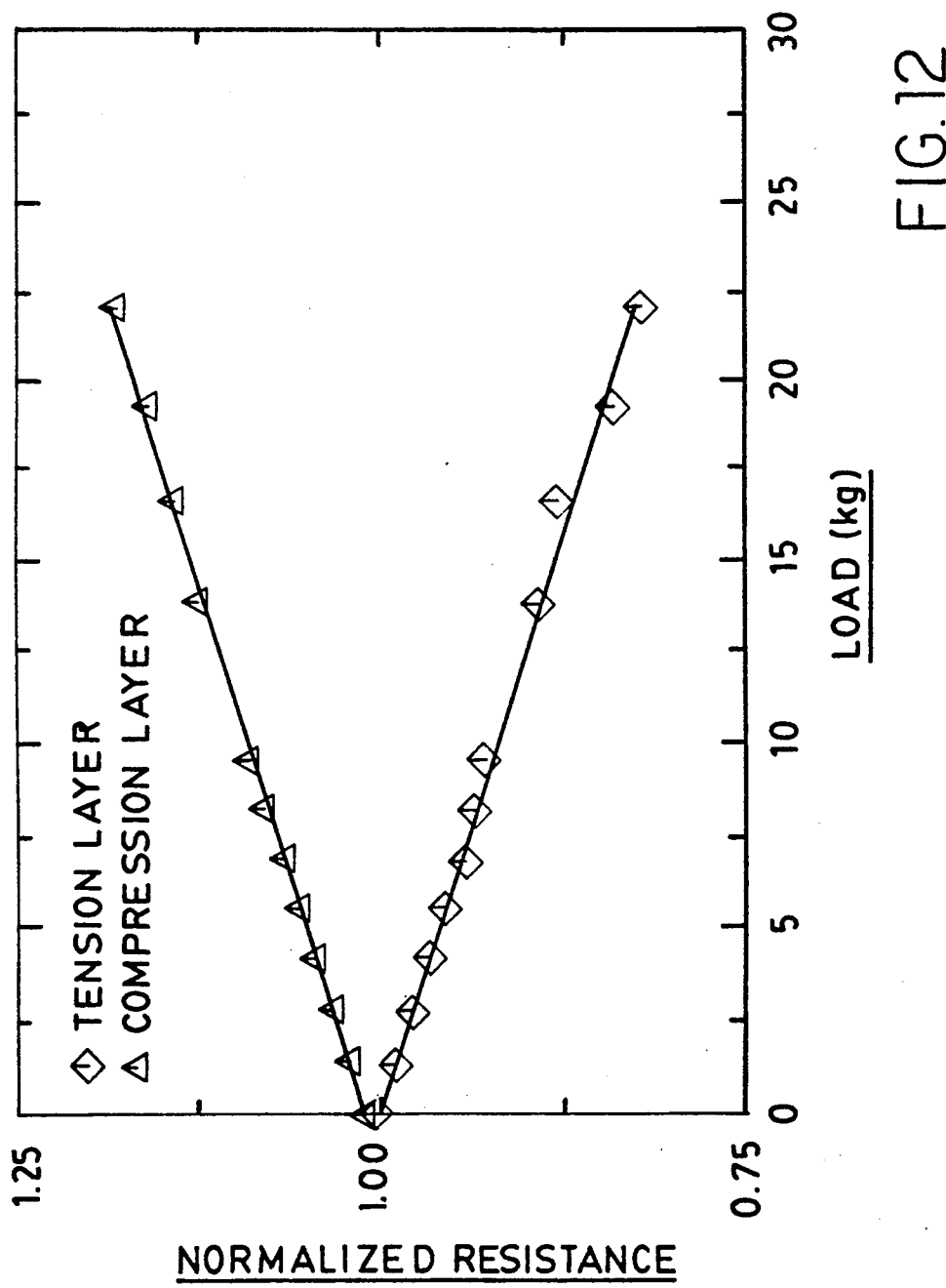
FIG. 12 is a graph illustrating how the resistivity of the sensor of Example 3 varies with pressure and a constant temperature of 135 Degrees Celsius.

FIG. 12 is a graph illustrating how such resistance varied in both the tension and the compression layer of the sensor as the load upon the sensor was applied.

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

We claim:

1. A process for preparing a sintered metal titanate sensor, comprising the steps of:
   (a) providing a material comprised of metal titanate, from about 0.01 to about 5.0 atom percent based on the weight of metal titanate of an aliovalent, cationic dopant, and from about 0.1 to about 1.0 weight percent based on the weight of metal titanate of cationic counterdopant, wherein:
      1. said metal titanate is selected from the group consisting of barium titanate, strontium titanate, lead titanate, and mixtures thereof;
      2. the cation in said aliovalent dopant is selected from the group consisting of lanthanum, yttrium, niobium, antimony, samarium, holmium, gadolinium, and mixtures thereof;
      3. the cation in said cationic counterdopant is selected from the group consisting of chromium, manganese, iron, cobalt, nickel, copper, and mixtures thereof; and
      4. at least about 1.1 atoms of said aliovalent dopant cation are present for each atom of counterdopant cation in said material; and
   (b) forming said material into a green body;
   (c) raising the temperature of said green body from ambient to about 1,300 degrees Celsius while contacting said green body with air;
   (d) raising the temperature of said green body to a temperature of from about 1,300 Celsius to about 1,500 Celsius while contacting said green body with an oxygen-free atmosphere; and
   (e) cooling said green body from a temperature of from about 1,300 to about 1,500 Celsius to ambient while contacting said green body with an oxidizing gas.

2. The process as recited in claim 1, wherein said metal titanate is barium titanate.

3. The process as recited in claim 2, wherein said oxygen-free atmosphere is nitrogen.

4. The process as recited in claim 3, wherein said oxidizing gas is oxygen.

5. The process as recited in claim 4, wherein said material comprised of barium titanate is a gel comprised of said barium titanate.

6. The process as recited in claim 5, wherein said gel is dried until it contains less than about 1.0 weight percent of moisture, thereby providing a dried barium titanate composition.

7. The process as recited in claim 6, wherein said dried barium titanate composition is calcined at a temperature of from about 200 to about 1,000 Celsius for from about 1 to about 10 hours, thereby producing a calcined barium titanate composition.

8. The process as recited in claim 7, wherein said calcined barium titanate composition is mixed with from about 10 to about 50 weight percent, based on the weight of barium titanate and binder, of organic binder, thereby forming a mixture of calcined barium titanate and binder.

9. The process as recited in claim 8, wherein said mixture of calcined barium titanate and binder is formed into a green body.

10. The process as recited in claim 9, wherein the temperature of said green body is raised from ambient to a temperature of about 700 degrees Celsius at a rate of less than about 50 degrees Celsius per hour while contacting said green body with air.

11. The process as recited in claim 10, wherein the temperature of said green body is raised from a temperature of from about 700 to about 1,300 Celsius at a rate different than the rate of claim 10 while contacting said green body with air.

* * * * *